(12) United States Patent
Mukhtar et al.

(10) Patent No.: US 10,855,450 B1
(45) Date of Patent: Dec. 1, 2020

(54) SECURED AND ROBUST WIRELESS COMMUNICATION SYSTEM FOR LOW-LATENCY APPLICATIONS

(71) Applicant: DESC (Dubai Electronic Security Center), Dubai (AE)

(72) Inventors: Husameldin Hussain Adam Mukhtar, Dubai (AE); Arafat Al-Dweik, Abu Dhabi (AE); Tasnim Bassam Sami Nazzal, Dubai (AE); Hussain Al-Ahmad, Dubai (AE); Wathiq Mansoor, Dubai (AE)

(73) Assignee: DUBAI ELECTRONIC SECURITY CENTER, Dubai (AE)

( * ) Notice: Subject to any disclaimer, the term of this patent is extended or adjusted under 35 U.S.C. 154(b) by 0 days.

(21) Appl. No.: 16/905,242

(22) Filed: Jun. 18, 2020

(51) Int. Cl.
| | |
|---|---|
| *H04L 29/06* | (2006.01) |
| *H04L 9/06* | (2006.01) |
| *H04L 27/26* | (2006.01) |
| *H04J 11/00* | (2006.01) |
| *H04L 25/03* | (2006.01) |
| *H04K 3/00* | (2006.01) |
| *H04B 7/0413* | (2017.01) |

(52) U.S. Cl.
CPC .......... *H04L 9/065* (2013.01); *H04B 7/0413* (2013.01); *H04J 11/00* (2013.01); *H04K 3/20* (2013.01); *H04L 25/03* (2013.01); *H04L 27/2601* (2013.01); *H04L 2209/80* (2013.01)

(58) Field of Classification Search
CPC ..... H04L 9/065; H04L 25/03; H04L 27/2601; H04L 2209/80; H04J 11/00; H04K 3/20; H04B 7/0413
See application file for complete search history.

(56) References Cited

U.S. PATENT DOCUMENTS

| | | | | |
|---|---|---|---|---|
| 7,263,133 | B1 * | 8/2007 | Miao | H04B 1/71632 370/208 |
| 8,601,269 | B2 * | 12/2013 | Batra | H04W 12/003 713/171 |
| 9,660,709 | B1 * | 5/2017 | Chavali | H04B 1/71057 |
| 2007/0014409 | A1 * | 1/2007 | Batra | H04L 1/0059 380/270 |
| 2013/0159698 | A1 * | 6/2013 | Al-Dweik | H04L 9/0875 713/151 |

(Continued)

OTHER PUBLICATIONS

White Paper, "Overview of the NI USRP RIO Software Defined Radio", Retrieved From https://www.ni.com/en-us/innovations/white-papers/14/overview-of-the-ni-usrp-rio-software-defined-radio.html, Published Mar. 5, 2019. (Year: 2019).*

(Continued)

*Primary Examiner* — Chau Le
(74) *Attorney, Agent, or Firm* — Hayes Soloway PC

(57) ABSTRACT

There is provided a physical layer security (PLS) system for enhanced cryptographic security and diversity of transmitted data, the system comprising a transmitter for first, converting the data into a plurality of OFDM symbols; second, multiplexing the plurality of OFDM symbols into parallel M OFDM streams; and third, performing spatial interleaving (SI) on the parallel M OFDM streams using a secret key. The system further comprises a receiver for receiving and descrambling the transmitted plurality of data samples, wherein software-defined radio (SDR) units are used as the system transmitter and receiver.

18 Claims, 12 Drawing Sheets

(56) References Cited

U.S. PATENT DOCUMENTS

2018/0041321 A1* 2/2018 Guo .................... H04L 5/0048
2019/0104518 A1* 4/2019 Zeng ................... H04L 27/2613
2019/0373458 A1* 12/2019 Dandekar ............ H04L 5/0055

OTHER PUBLICATIONS

Ha Nguyen, "Introduction to Orthogonal Frequency-Division Muliplexing (OFDM)", University of Saskatchewan, Retrieved From http://www.engr.usask.ca/classes/EE/456/slides/OFDM-Slides-F15.pdf, Published Sep. 2015. (Year: 2015).*

Bouvet et al., "An Analysis of MIMO-OFDM for Shallow Water Acoustic Communications", Retrieved From https://ieeexplore.ieee.org/document/6107068, Published Sep. 2011 (Year: 2011).*

* cited by examiner

Welcome to the University of Dubai website. Here you can learn about our programs of study, meet faculty and students, explore our campus, and appreciate the associations between the University of Dubai and the city of Dubai – our extended campus.

The University of Dubai has been home to talented students and faculty drawn from around the world to teach, create, and study. We have achieved international

SECURED AND ROBUST WIRELESS COMMUNICATION SYSTEM FOR LOW-LATENCY APPLICATIONS

FIELD OF THE INVENTION

The present invention relates to a cryptographic security system, and more particularly a physical-layer security (PLS) system for orthogonal frequency-division multiplexing (OFDM) and multiple-input multiple-output (MIMO) communication systems.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

Although modern wireless communication systems are highly robust against various transmission impairments, they do not have any inherent security features. Hence, additional encryption or decryption algorithms are required to be implemented to achieve data security. Most information security algorithms are implemented in the higher layers of the Open Systems Interconnection (OSI) model. The main limitation of such commonly designed ciphers is their low speed, which is a major drawback for currently used broadband systems.

In one traditional system, a Time-Domain Interleaving (TDI) algorithm for OFDM based systems is proposed. The proposed system operates on the time domain samples post the Inverse Fast Fourier Transform (IFFT). The TDI system can provide security and diversity with low computational complexity, which makes the system attractive for high-speed broadband communication systems. Nevertheless, the proposed system assumes an arguable long interleaver, which can introduce significant delays in practical systems. In another system, a PHY layer key generation technique is proposed for MIMO-OFDM systems. However, the proposed scheme only generates a PHY layer key but then uses the generated key to encrypt the transmitted message using higher layer cryptosystems, which are relatively complex and slow. Several OFDM or MIMO systems implement scrambling techniques on the frequency or time domain symbols. The main drawback of these techniques is the absence of space diversity, which can further improve system performance.

Accordingly, there exists a need for a security system with improved performance which provides security using the time or space domain with better immunity.

SUMMARY OF THE INVENTION

Therefore it is an object of the present invention to develop a cryptographic security system with improved performance which provides security using the time or space domain with better immunity.

The present invention involves a method of encrypting data using a physical layer security (PLS) system at a transmitter before transmission to a receiver for enhanced security and diversity of transmitted data, the method comprising the steps of first, converting the data into a plurality of OFDM symbols; second, multiplexing the plurality of OFDM symbols into parallel M OFDM streams; and third, performing spatial interleaving (SI) on the parallel M OFDM streams using a secret key.

In another embodiment of the present invention, the secret key is known a priori by the receiver for decryption purposes.

In another embodiment of the present invention, spatial interleaving (SI) scrambles the plurality of OFDM symbols across transmit antennas at the transmitter, using the secret key.

In another embodiment of the present invention, the transmitted signal is changed such that the receiver is unable to recover correct data from the received signal unless the receiver re-scrambles the received signal using the secret key used at the transmitter.

In another embodiment of the present invention, the PLS system is used for encryption in MIMO-OFDM applications.

In another embodiment of the present invention, PLS system security is proportional to $(N \times M \times L)!$, wherein N refers to data or number of OFDM symbols, M is number of transmit antennas and L is interleaver depth which refers to system delay or latency.

In another embodiment of the present invention, for an OFDM system with $N=128$ and $M=2$, number of trials required to break the system for $L=1$ is $256! > 2^{1683}$.

In another embodiment of the present invention, minimum mean-squared error (MMSE) equalization technique is used at the receiver for minimizing error signals.

As another aspect of the present invention, a physical layer security (PLS) system is disclosed for enhanced cryptographic security and diversity of transmitted data, the system comprising a transmitter for first, converting the data into a plurality of OFDM symbols; second, multiplexing the plurality of OFDM symbols into parallel M OFDM streams; and third, performing spatial interleaving (SI) on the parallel M OFDM streams using a secret key.

In another embodiment of the present invention, the PLS system further comprises a receiver for receiving and de-scrambling the transmitted data, wherein both the transmitter and receiver are software-defined radio (SDR) units.

In another embodiment of the present invention, the SDR units are NI USRP RIO devices.

In another embodiment of the present invention, spatial interleaving (SI) scrambles the plurality of OFDM symbols across a plurality of transmit antennas at the transmitter, using the secret key.

In another embodiment of the present invention, the plurality of transmit antennas are multiple-input and multiple-output (MIMO) antennas.

In another embodiment of the present invention, the system provides more than 20 dB signal-to-noise ratio (SNR) improvement.

In another embodiment of the present invention, PLS system security is proportional to $(N \times M \times L)!$, wherein N refers to data or number of OFDM symbols, M is number of transmit antennas and L is interleaver depth which refers to system delay or latency.

In another embodiment of the present invention, the interleaver depth (L) used is 1, which reduces overall system latency in comparison with traditional Time Interleaving (TI) systems.

In another embodiment of the present invention, the transmitted signal is changed such that the receiver is unable to recover correct data from a received signal unless the receiver re-scrambles the received signal using the secret key used at the transmitter.

In another embodiment of the present invention, the PLS system is used for encryption in MIMO-OFDM applications.

In another embodiment of the present invention, minimum mean-squared error (MMSE) equalization is used at the receiver for minimizing error signals.

In another embodiment of the present invention, the PLS system is immune to narrowband jamming, and eliminates extra overhead introduced by conventional cryptosystems.

BRIEF DESCRIPTION OF THE DRAWINGS

The subject matter that is regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 11 shows a correctly decoded text message when the correct key is used at the receiver, in accordance with the present invention.

FIG. 12 shows an incorrectly decoded text message when an incorrect key is used at the receiver, in accordance with the present invention.

DETAILED DESCRIPTION OF THE INVENTION

Figure 1:
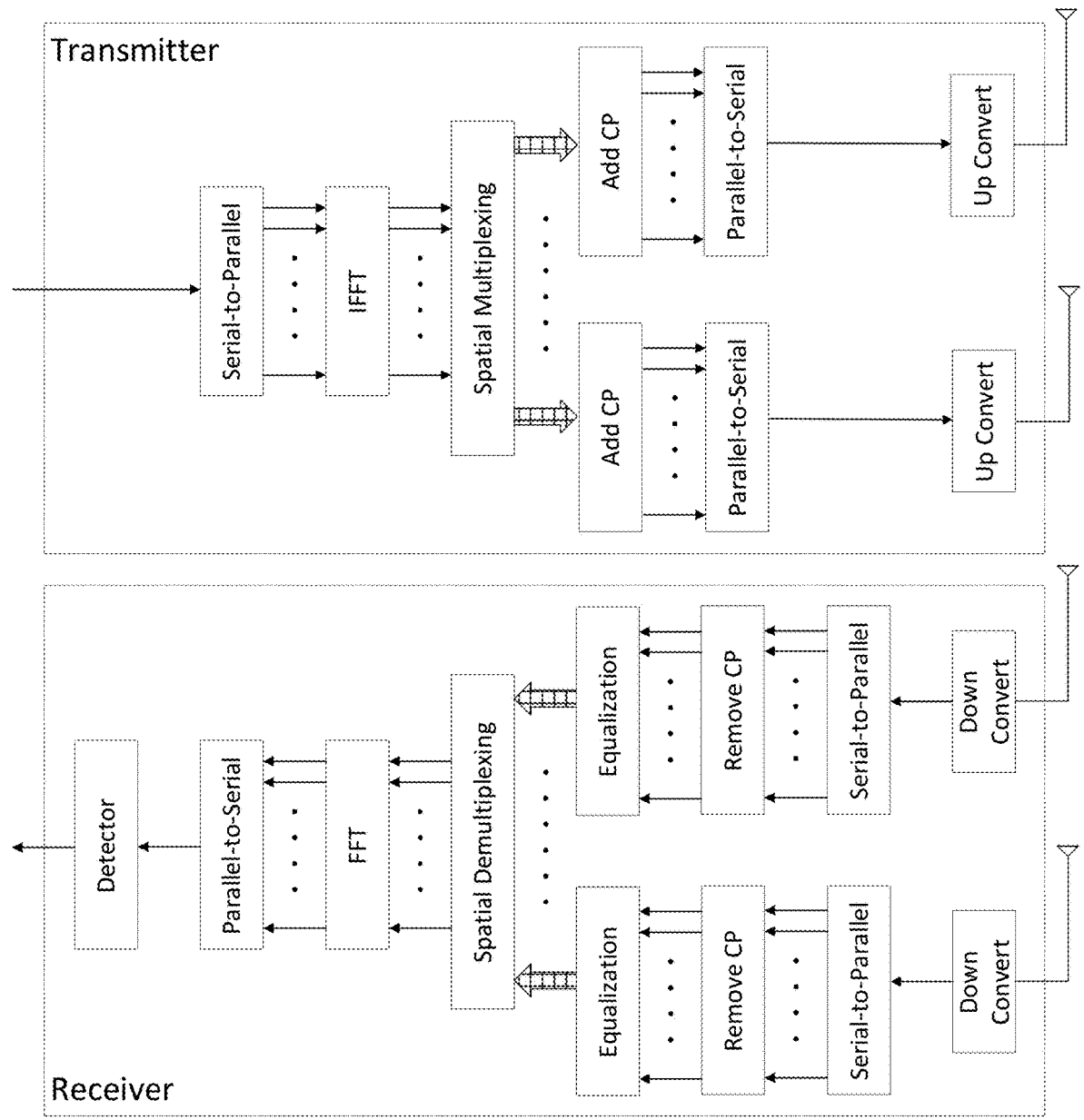
FIG. 1 shows a block diagram of a conventional MIMO-OFDM (prior-art).
Figure 2:
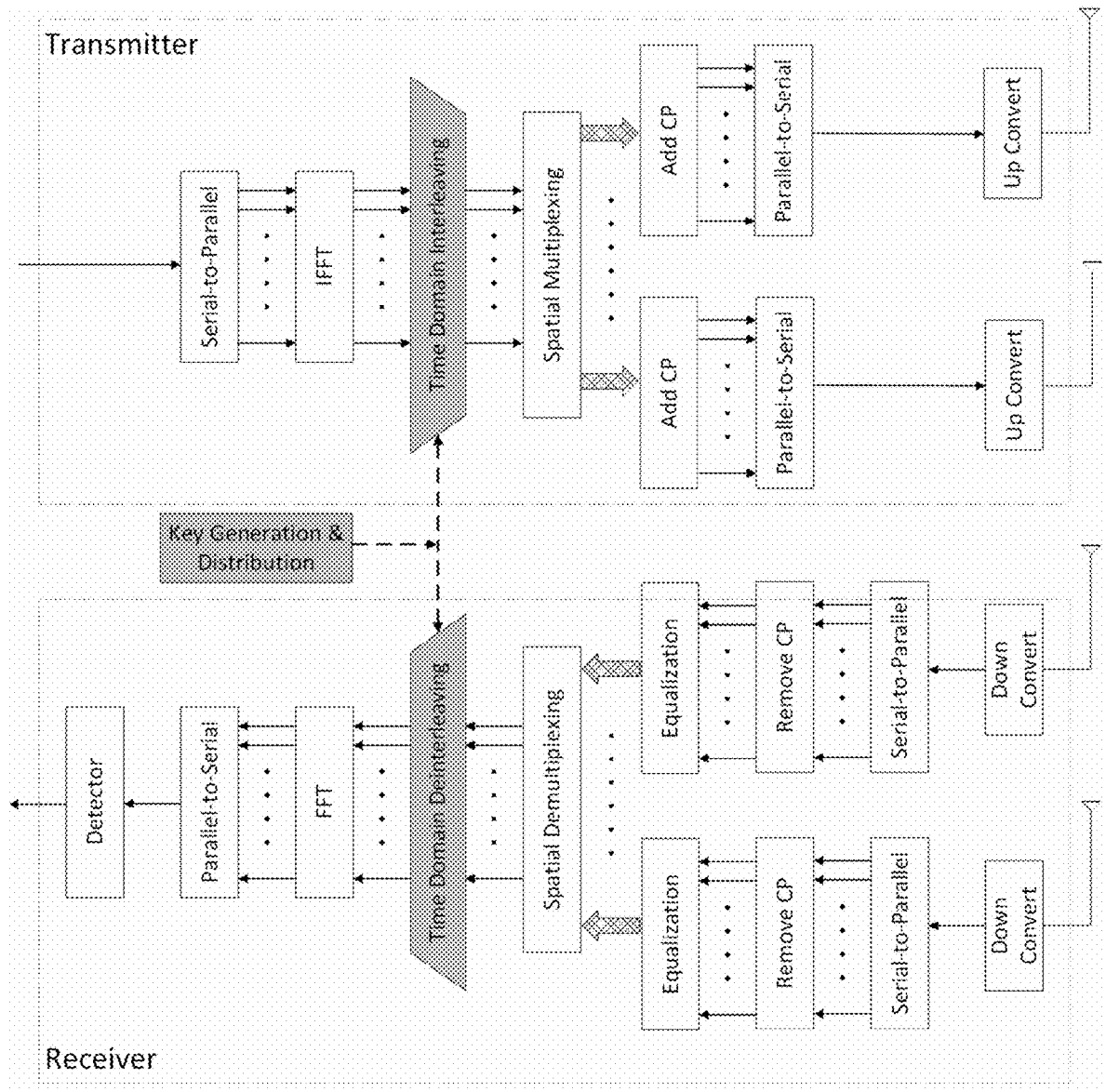
FIG. 2 shows TDI applied to MIMO-OFDM systems (prior-art).

The aspects of a cryptographic security system with improved performance which provides security using the time or space domain with better immunity, according to the present invention will be described in conjunction with FIGS. 1-15. In the Detailed Description, reference is made to the accompanying figures, which form a part hereof, and in which is shown by way of illustration specific embodiments in which the invention may be practiced. It is to be understood that other embodiments may be utilized and logical changes may be made without departing from the scope of the present invention. The following detailed description, therefore, is not to be taken in a limiting sense, and the scope of the present invention is defined by the appended claims.

Considering the drawbacks from traditional systems, substantial research efforts were recently steered towards PLS algorithms. Several security systems are based on the general concept of building an interleaving technique by scrambling the frequency domain symbols. Moreover, limited research has been conducted to perform security using the time or space domain samples of OFDM or MIMO signals. The PLS algorithm proposed in the present invention offers space, time and frequency diversity. Subsequently, better immunity not only against channel impairments but also against jamming is achieved. Moreover, for a given delay constraint, the proposed PLS provides stronger security when compared to other frequency or time domain PHY layer scrambling techniques. This is because the number of symbols involved in the scrambling process is higher in the proposed PLS system without incurring additional delay.

The MIMO-OFDM structure is exploited to develop a low complexity secured communication system that relies on the sensitivity of MIMO-OFDM systems to synchronization errors. At the transmitter side, Spatial Interleaving (SI) is applied across MIMO antennas using a secret key. At the receiver side, de-interleaving is performed using the same secret key. A rogue receiver (eavesdropper) will not be able to decode the received signal without the knowledge of the secret key. In a MIMO-OFDM transmitter with M transmit antennas, a MIMO-OFDM symbol is composed of M OFDM symbols. The size of each OFDM symbol is N samples. Therefore, each MIMO-OFDM symbol is of size N×M symbols. In the proposed PLS, spatial or antenna interleaving is performed across one or multiple L MIMO-OFDM symbols. Therefore, in every interleaving block, interleaving is performed across N×M×L samples. The interleaver depth is referred to as L. The larger the interleaver depth is, the larger the latency will be. The system security is proportional to (N×M×L)!. The system is practically secured as long as N×M×L is large enough. Typically, for MIMO-OFDM, N≥128, M≥2, and L≥1. Accordingly, an attempt for breaking the system requires to perform (N×M×L)! exhaustive-search trials, which is practically infeasible.

In an embodiment of the present invention, an interleaver depth of L=1 is sufficient to achieve strong secrecy and enhanced transmission robustness. This is achieved with the same buffering delay requirement as in a conventional MIMO-OFDM system. Moreover, the proposed PLS system provides combined modulation and security, which eliminates the extra overhead introduced by conventional cryptosystems. Conventional cryptosystems are considered as overhead since they are implemented as a separate layer in communication systems. The proposed PLS system is based on Spatial Interleaving (SI) across MIMO antennas. Hence, it provides an alternative security solution using low complexity signal processing. In addition, MIMO with SI has the advantage of using shorter interleavers, hence, reducing the system latency when compared to traditional Time Interleaving (TI) systems (resulting in low complexity and reduced latency).

In an embodiment of the present invention, the proposed PLS algorithm achieves enhanced transmission robustness (against multipath fading and narrowband jamming) and has inherent space, time and frequency diversity. The error performance of MIMO-OFDM systems is significantly enhanced when SI is implemented. Simulation results show that the SI system can provide more than 20 dB signal-to-noise ratio (SNR) improvement. This can be translated into 99% saving in transmit power, better coverage or higher data rate. In addition, the system provides protection against narrowband jamming Narrowband jamming, which is a form of denial of service (DoS) attack, causes significant degradation in the bit error rate (BER) performance of a wireless communication system. However, due to the introduced space, time and frequency diversity in the proposed system, such attacks can be mitigated.

Several other advantages achieved through using the proposed PLS algorithm include a low-latency and low-complexity security system, joint-immunity against eavesdropping and jamming, and a configurable PLS system with configurable delay and security-strength tradeoff. The higher the number of the antennas the higher the level of security without noticeable increase in delay, achieving combined transmission diversity in frequency, time and space.

In another embodiment of the present invention, the proposed PLS has low-complexity, therefore, providing an alternative security solution for systems with limited computational power such as Internet of Things (IoT) devices and battery-operated devices. Further, the proposed system eliminates the extra overhead introduced by conventional cryptosystems, and hence provides a practical security solution for low-latency applications such as video communications, vehicular communications and tactile internet. The system also offers joint-immunity against eavesdropping and jamming unlike conventional upper layer cryptosystems, which provide immunity against eavesdropping but not against jamming. Moreover, the system provides better error performance and jamming mitigation compared to frequency or time domain scrambling techniques. This is due to the combined frequency, time and space diversity in the proposed PLS.

Additionally, compared to frequency or time domain scrambling, the system provides stronger security without a noticeable increase in delay. This is achieved by spatial interleaving over parallel symbol streams. The interleaving is expanded in the spatial dimension rather than time by using higher number of antennas. The security strength of the proposed Spatial Interleaving may be limited for systems which are not OFDM-based. For such systems and assuming delay constraints, a large number of spatial channels between the transmitter and receiver is needed to achieve strong security. However, for OFDM systems, spatial interleaving provides strong security even for a small number of spatial channels. Due to the way OFDM frames are constructed, spatial interleaving inherently provides space and time scrambling without additional frame delay. The bit error rate (BER) performance improvement is noticeable in systems with mobility where channel fading exists. However, performance improvement can still be achieved in stationary systems, which have flat fading channels but suffers from interference, impulsive noise or narrowband jamming.

FIG. 1 shows a block diagram of a conventional MIMO-OFDM system. OFDM is a spectral efficient multicarrier modulation scheme with orthogonal subcarriers. It is based on splitting a high bit rate data stream into multiple N parallel lower bitrate symbol streams, each is transmitted over a separate subcarrier. The OFDM symbols are produced through the use of an Inverse Fast Fourier Transform (IFFT). The OFDM symbol after the IFFT can be expressed as:

$$s(t) = \sum_{n=0}^{N-1} d_k e^{j2\pi \times n \times \Delta f \times t} \quad (1)$$

$$0 \leq t \leq T_s$$

where N is the number of OFDM subchannels, $d_n$ is a modulation complex symbol to be transmitted on subcarrier n, whereas $T_s$ is the symbol duration, and $\Delta f$ is the subcarrier separation of OFDM ($T_s \times \Delta f = 1$). OFDM subcarriers $d_n$ represent the source data after modulation in addition to some pilot and null tones. The pilot subcarriers are used for channel estimation and subsequently equalization at the receiver. The null subcarriers provide the DC null and buffers between the OFDM symbols.

MIMO enables the simultaneous transmission of multiple OFDM signals through spatial multiplexing over multiple antennas to increase system capacity. The discretized OFDM signal can be referred to as column vector composed of N samples: $s = [s_0, s_1, s_{N-1}]^T$. MIMO, with M transmit antennas, enables simultaneous transmission of M OFDM symbols within one symbol duration T. After spatial multiplexing, the MIMO-OFDM column vector over one $T_s$ can be represented as $x = [s_0, s_1, \ldots, s_{M-1}]^T$, where the size of x is K×1 samples and K=N×M. Over multiple symbol duration, t=L× $T_s$, the MIMO-OFDM signal can be represented as a matrix:

$$X = [x_0 \quad x_1 \quad \ldots \quad x_{L-1}] = \begin{bmatrix} s_{0,0} & s_{0,1} & \ldots & s_{0,L-1} \\ s_{1,0} & s_{1,1} & \ldots & s_{1,L-1} \\ \vdots & \vdots & \ddots & \vdots \\ s_{M-1,0} & s_{M-1,1} & \ldots & s_{M-1,L-1} \end{bmatrix}$$

For each OFDM symbol $\hat{s}_{i,j}$ where $i \in \{0, M-1\}$ and $j \in \{0, L-1\}$, a guard interval is created by using a cyclic prefixes (CP) in which the last part of an OFDM symbol is copied and inserted as the first part of the OFDM symbol. CPs are added to avoid ISI and to be used for synchronization at the receiver. Finally, each row in X is up converted to create a passband signal suitable for transmission through an antenna. At the receiver side, the inverse operations are implemented. First, the MIMO-OFDM signals are received via multiple antennas. It is assumed that the number of receive antennas is equal to the number of transmit antennas. The MIMO-OFDM signals are down converted to the baseband. CPs are used for synchronization and then removed. Equalization is performed to remove the effect of multipath interference. The MIMO-OFDM signals are then demultiplexed into parallel OFDM stream. Each stream is converted back to the frequency domain using the FFT. Finally, the source symbols are detected to recover the transmitted information bits.

In traditional systems, a Time-Domain Interleaving (TDI) algorithm for OFDM based systems has been proposed. The TDI system operates on the time domain samples post the Inverse Fast Fourier Transform (IFFT). TDI can be applied to MIMO-OFDM systems as shown in a system block diagram of FIG. 2. It can provide security and diversity with low computational complexity, which makes the system attractive for high-speed broadband communication systems. Nevertheless, the proposed system assumes an arguable long interleaver, which can introduce significant delays in practical systems.

Figure 3:
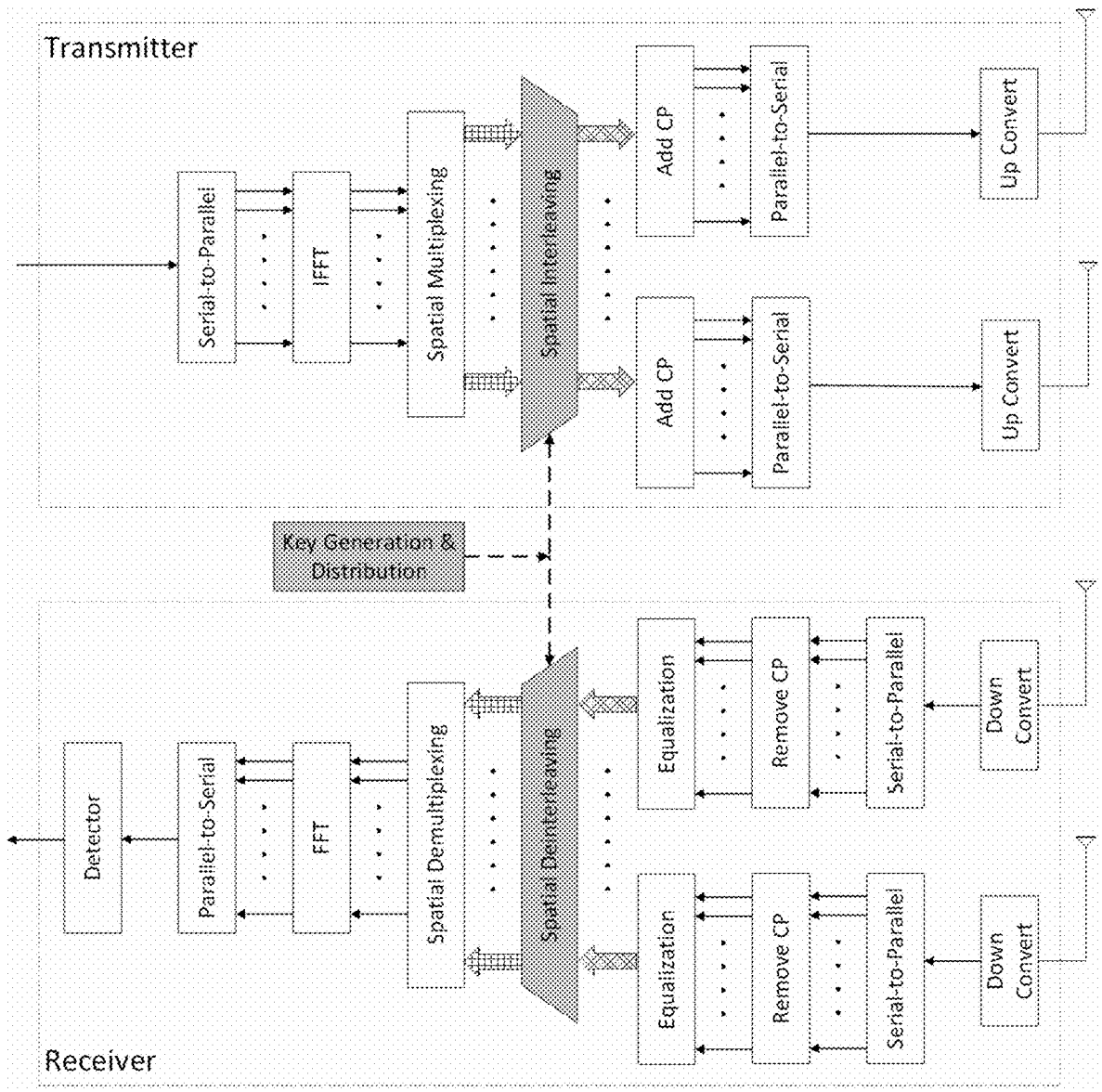
FIG. 3 depicts the proposed PLS system using SI, in accordance with the present invention.

FIG. 3 shows the block diagram of the proposed PLS system. After the OFDM symbols are multiplexed into parallel M streams, spatial interleaving (SI) is performed on the parallel M OFDM symbols using a secret key. At the receiver, decoding the received signal would be impossible without the knowledge of the secret key. Unlike TDI, SI is applied after the spatial multiplexing and can hence provide additional dimension for security and diversity, namely, the spatial dimension. SI scrambles the data samples across the transmit antennas using a secret sequence. Therefore, the transmitted signal is changed such that the receiver will not be able to recover the correct data unless it re-scrambles it again based on the same secret sequence used at the transmitter. For an unauthorized receiver (eavesdropper) who does not have the correct key, the received signal will be a noise signal.

In a MIMO-OFDM transmitter with M transmit antennas, a MIMO-OFDM symbol x is composed of M OFDM symbols s. The size of each OFDM symbol s is N samples. Therefore, each MIMO-OFDM symbol x is of size N×M symbols. In our proposed PLS, Spatial/Antenna Interleaving is performed across one or multiple L MIMO-OFDM symbols. Therefore, in every interleaving block X, interleaving is performed across N×M×L samples. We refer to L as the interleaver depth. The larger the interleaver depth is, the larger the latency will be. An interleaver depth of L=1 is sufficient to achieve strong secrecy and enhanced transmission robustness. This is achieved within one symbol duration $T_s$ that is the same delay as in conventional MIMO-OFDM. The system security is proportional to (N×M×L)!. The system is practically secured as long as N×M×L is large enough. For certain MIMO-OFDM applications where N≥128, and M≥2, it may be assumed that L=1 because breaking the system requires to perform (N×M)! exhaustive-search trials, which is practically infeasible.

For an OFDM system with N=128 and M=2, the number of trials required to break the system given that L=1 is huge as $256!>2^{1683}$. Thus, it is computationally infeasible to break this system by the exhaustive search. Moreover, as a result of the spatial interleaving, the received signal becomes highly immune to channel impairments and to narrowband jamming. These benefits stem from the fact that the applied SI algorithm introduces space, time and frequency diversity, which improves the system performance in terms of not only bit error rate (BER), coverage, and/or power efficiency, but also immunity to narrowband jamming.

In an embodiment of the present invention, the performance of the proposed SI system over frequency-selective multipath fading MIMO channels is evaluated using Monte Carlo simulations. The assumed MIMO-OFDM system and channel parameters are listed in Table 1. These parameters are similar to practical values available in LTE networks. The multipath MIMO channels are Rayleigh fading channels with normalized delays of [0, 1, 2, 3] samples and average gains [0.50, 0.30, 0.18, 0.11].

TABLE 1

| MIMO-OFDM and channel parameters | |
| --- | --- |
| Number of subcarriers, N | 128 |
| Cyclic prefix length | 9 |
| Carrier frequency | 1800 MHz |
| Sampling frequency | 1.92 MHz |

TABLE 1-continued

| MIMO-OFDM and channel parameters | |
| --- | --- |
| Bandwidth | 1.4 MHz |
| Symbol modulation | 4-QAM |
| Multipath delay spread | 2 µs |
| User speed | 20 m/s |

Figure 4:
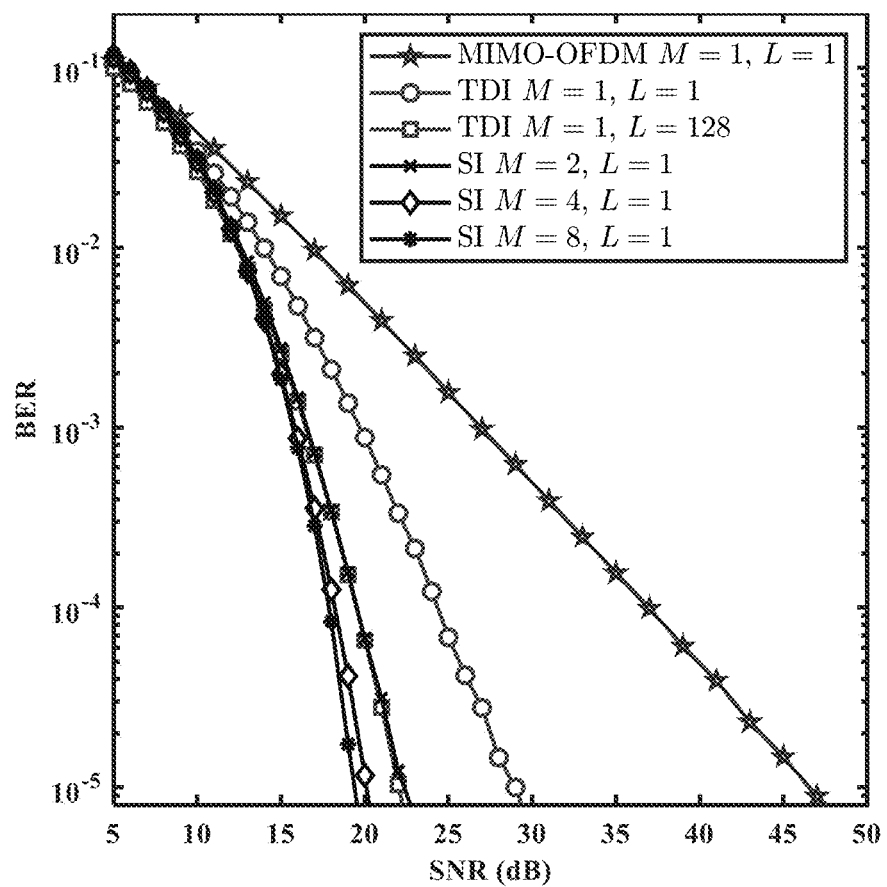
FIG. 4 graphically shows BER performance comparison of proposed SI system with other systems over MIMO Rayleigh fading channels, in accordance with the present invention.
Figure 5:
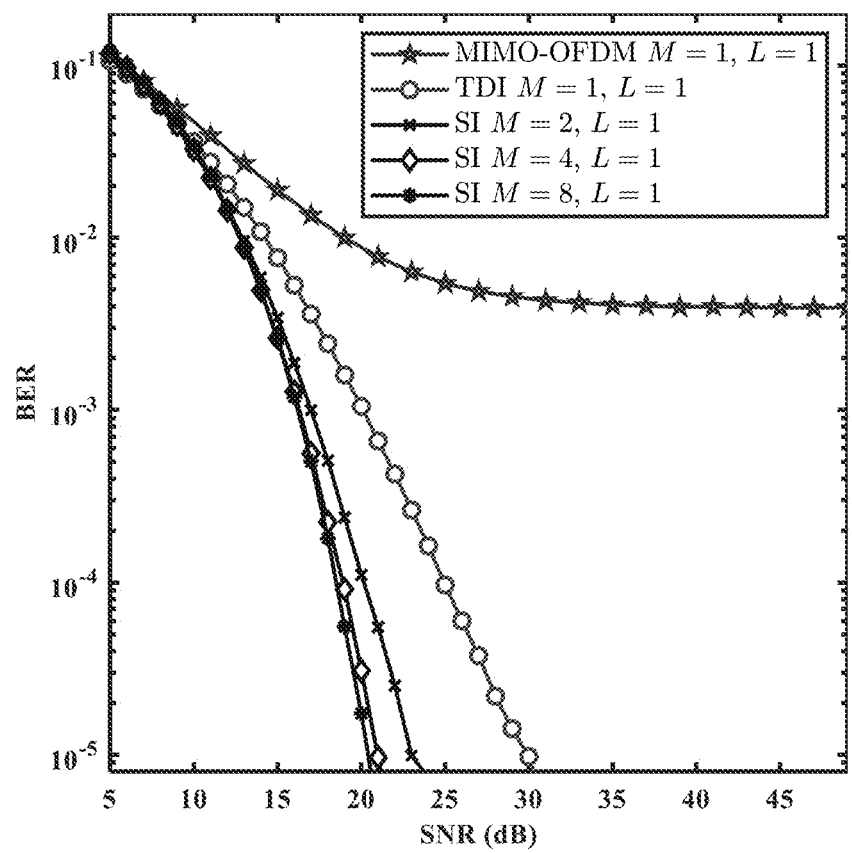
FIG. 5 graphically shows BER performance over MIMO Rayleigh fading channels with 1 subcarrier under jamming, in accordance with the present invention.
Figure 6:
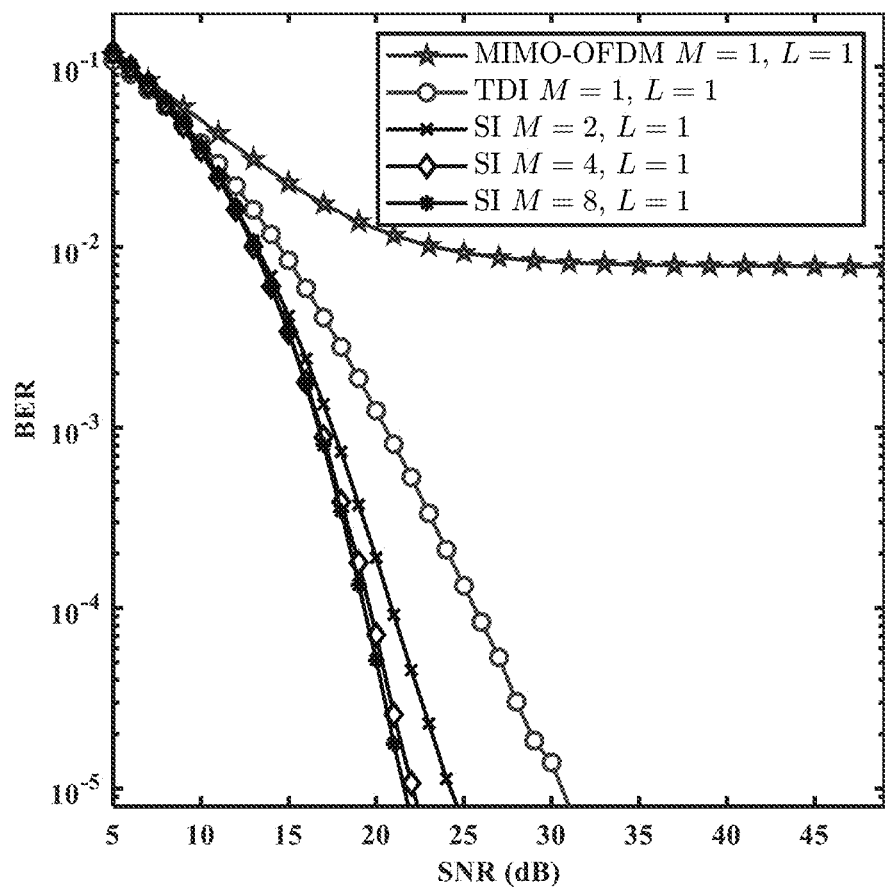
FIG. 6 graphically shows BER performance over MIMO Rayleigh fading channels with 2 subcarriers under jamming, in accordance with the present invention.
Figure 7:
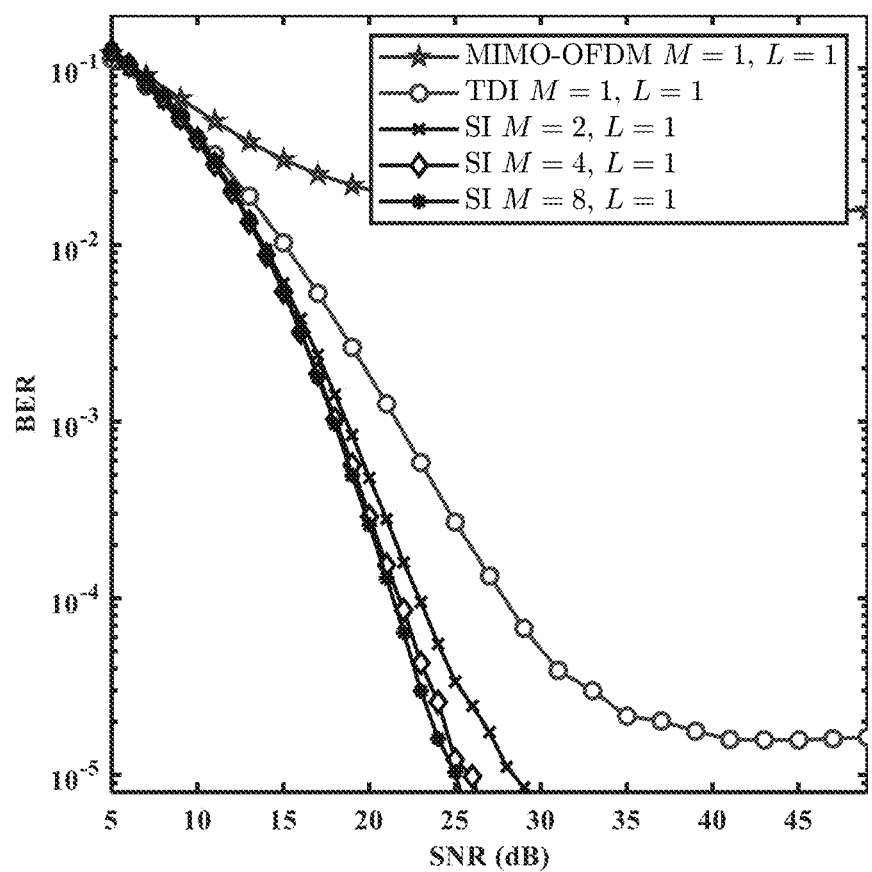
FIG. 7 graphically shows BER performance over MIMO Rayleigh fading channels with 4 subcarriers under jamming, in accordance with the present invention.
Figure 8:
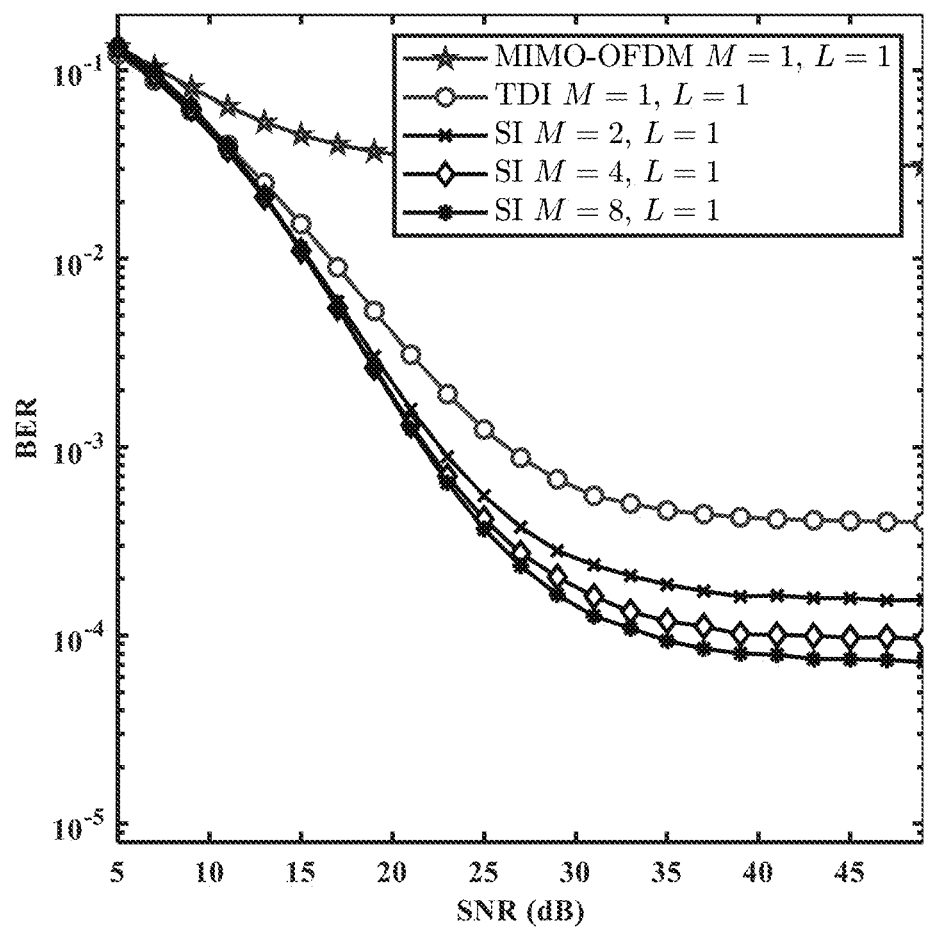
FIG. 8 graphically shows BER performance over MIMO Rayleigh fading channels with 8 subcarriers under jamming, in accordance with the present invention.

In an embodiment of the present invention, at the receiver, MMSE equalization is used. Full channel state information and perfect synchronization are assumed throughout the simulations. Each simulation run consists of 32768 independent OFDM symbols. The BER performance of the proposed SI system is evaluated and compared to conventional MIMO-OFDM and the TDI system. FIG. 4 shows the BER comparison over MIMO Rayleigh fading channels. The figure shows that the SI outperforms conventional MIMO-OFDM and the TDI system without any increase in delay (i.e. with L=1). The SI system with number of antennas as low as M=2 and symbol delay as low as L=1 provides the same performance as the TDI system with large symbol delay L=128 proposed in traditional systems. Moreover, maintaining L=1 and increasing the number of antennas M in the SI system further improves the BER performance That is because SI utilize the combined diversity of space, time and frequency; whereas, TDI has only time and frequency diversity.

FIGS. 5-8 shows the superior immunity of the proposed SI system to narrowband jamming when compared to conventional MIMO-OFDM and the TDI system. The BER results under narrowband jamming of 1, 2, 4, and 8 subcarriers are shown in FIGS. 5, 6, 7, and 8, respectively. The Figures show that MIMO-OFDM BER is significantly affected by narrowband jamming even with 1 subcarrier under jamming. The BER worsen when more subcarriers are jammed TDI have better BER performance under narrowband jamming when compared to conventional MIMO-OFDM. Nevertheless, SI provides the best BER performance under narrowband jamming.

The SI also outperforms the TDI in terms of security for a given delay constraint L. The security strength is proportional to (N×M×L)!. Table 2 shows the number of trials required in a brute force attack to break the security algorithm of the proposed SI system versus the TDI system. The numbers were calculated assuming N=128 and L=1. Therefore, the number of brute force trials in TDI is simply 128!. The table shows that the number of trials for both systems is too large making a brute force attack infeasible. However, in the proposed SI system, the number of trials is significantly larger and it exponentially increases with the number of antennas.

TABLE 2

| Security strength in terms of the number of brute force trials | | | |
| --- | --- | --- | --- |
| | M = 2 | M = 4 | M = 8 |
| SI | ~8.58 × $10^{506}$ | ~3.48 × $10^{1166}$ | ~5.42 × $10^{2639}$ |
| TDI | ~3.86 × $10^{215}$ | ~3.86 × $10^{215}$ | ~3.86 × $10^{215}$ |

Figure 9:
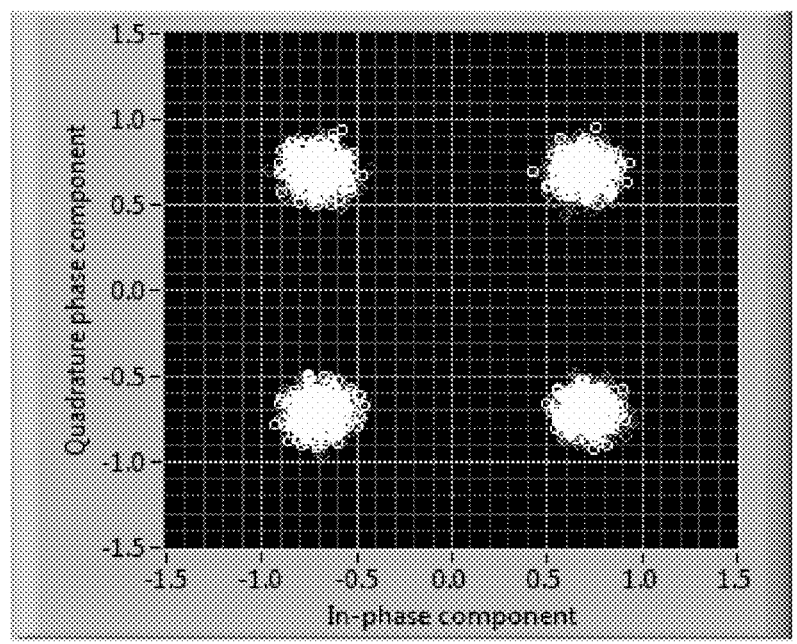
FIG. 9 shows 4-QAM constellation when the correct key is used at the receiver.
Figure 10:
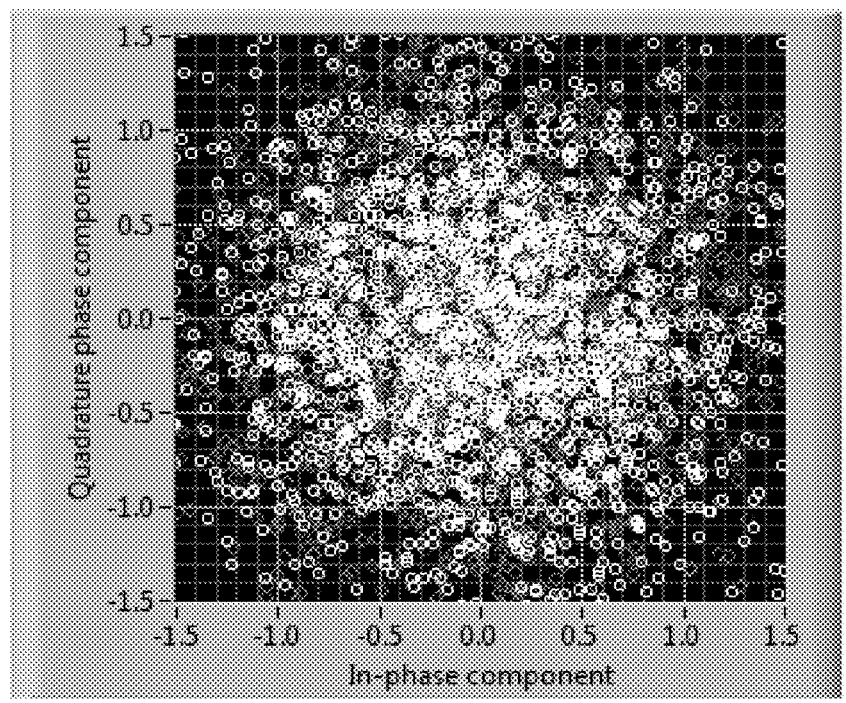
FIG. 10 shows 4-QAM constellation when an incorrect key is used at the receiver.
Figure 13:
FIG. 13 shows a correctly decoded image when the correct key is used at the receiver, in accordance with the present invention.
Figure 14:
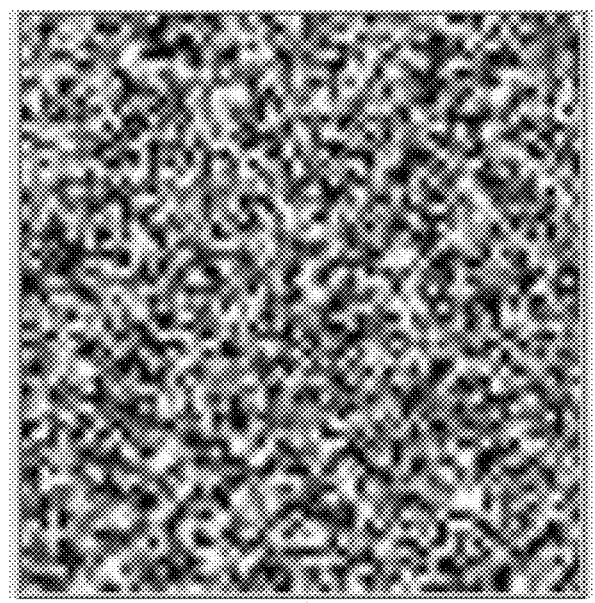
FIG. 14 shows an incorrectly decoded image when an incorrect key is used at the receiver, in accordance with the present invention.

The proposed SI system is implemented using radio prototyping hardware. FIG. 9 shows the 4-QAM constellation diagram when the correct key is used at the receiver. The 4 distinct point clusters indicate successful reception of the 4-QAM signal. For an eavesdropper, the received signal will be a noise signal as shown in the constellation diagram in FIG. 10. In addition, the proposed SI system has been evaluated for real applications such as text and image transmission. FIG. 11 shows correctly decoded text message when the correct key is used at the receiver and FIG. 12 shows incorrectly decoded text message when an incorrect key is used at the receiver. On the other hand, FIG. 13 shows correctly decoded image when the correct key is used at the receiver and FIG. 14 shows incorrectly decoded image when the correct key is used at the receiver.

In another embodiment of the present invention, a test-bed communication system is implemented to demonstrate the functionality of the proposed security system. Radio prototyping hardware is used to implement and test the proposed SI system. In particular, software-defined radio (SDR) units are used for rapid prototyping of the system transmitter and receiver. Moreover, the system is planned to be implemented in some government entities in Dubai after completing the testing phase.

Figure 15:
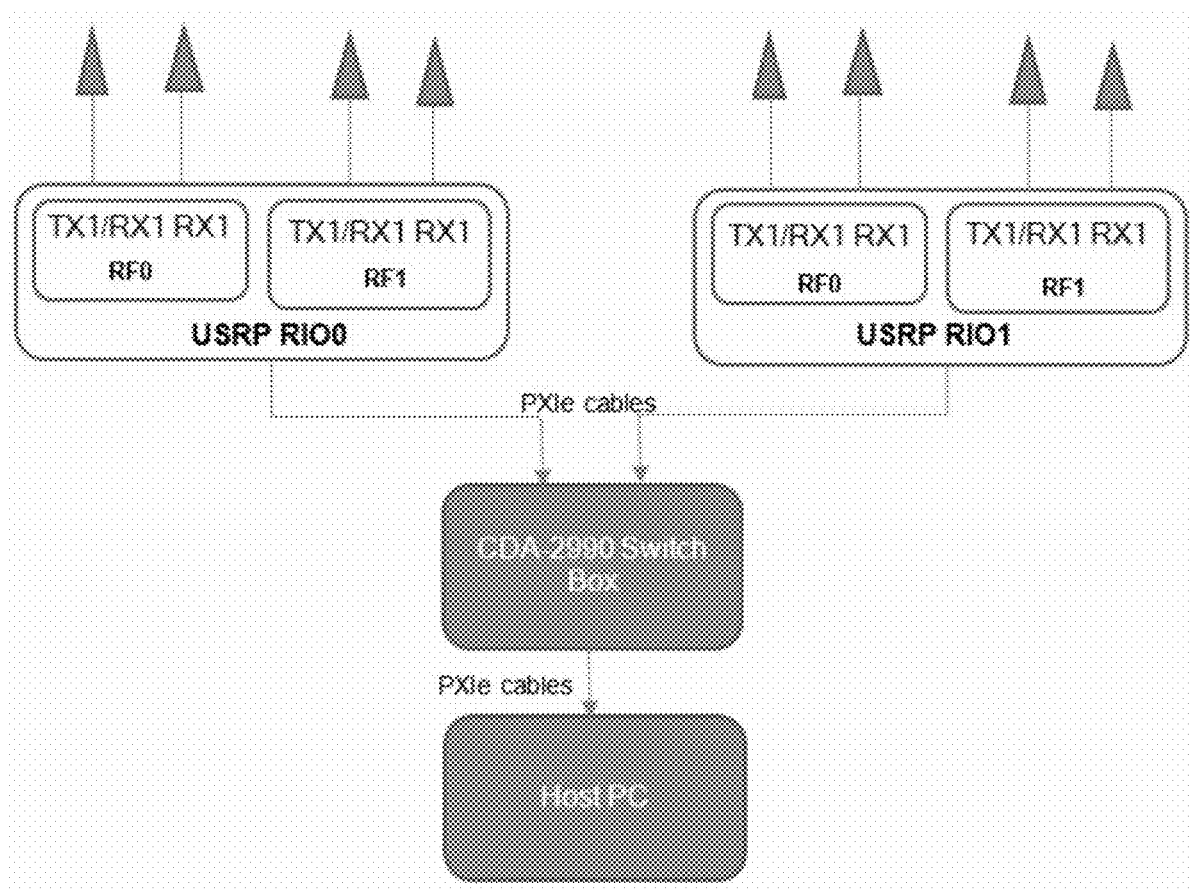
FIG. 15 is a block diagram of the hardware setup of the present invention.

In another embodiment, the hardware required to implement a 2×2 MIMO system with NI USRP RIO devices is shown in FIG. 15 as a hardware setup block diagram. NI USRP RIO devices have two daughter boards, so that each device can support 2 RF channels. Ultimately, this feature allows implementation of a maximum of 4×4 MIMO System with 2 USRP RIO devices. The following hardware is used to implement the present system—a PC, a CDA-2990 Switch Box, two USRP RIO devices (NI USRP 2942R device with 400 MHz-4.4 GHz (40 MHz BW) was used), eight antennas, PXIe cables and a Host Interface Card. Two antennas are connected to each RF ports on each of the 2 USRP RIO devices. For desired operation, the transmitting antennas should be at least half a wavelength (of the carrier frequency used) apart. After that, each USRP RIO device is connected to the Switch Box via PXIe x4 cables. Finally, the switch box is connected to the host PC with the interface card. The switch is used to switch between the USRPs as one is used for transmitter and the other for receiver.

Many changes, modifications, variations and other uses and applications of the subject invention will become apparent to those skilled in the art after considering this specification and the accompanying drawings, which disclose the preferred embodiments thereof. All such changes, modifications, variations and other uses and applications, which do not depart from the spirit and scope of the invention, are deemed to be covered by the invention, which is to be limited only by the claims which follow.

The invention claimed is:

1. A method of encrypting data using a physical layer security (PLS) system at a transmitter before transmission to a receiver for enhanced security and diversity of transmitted data, the method comprising the steps of:
    first, converting the data into a plurality of orthogonal frequency-division multiplexing (OFDM) symbols;
    second, multiplexing the plurality of OFDM symbols into parallel M OFDM streams;
    third, performing spatial interleaving (SI) on the parallel M OFDM streams using a secret key,
    wherein PLS system security is proportional to $(N \times M \times L)!$, wherein N refers to data or number of OFDM symbols, M is number of transmit antennas and L is interleaver depth which refers to system delay or latency and $M \geq 2$.

2. The method of claim 1, wherein the secret key is known a priori by the receiver for decryption purposes.

3. The method of claim 1, wherein spatial interleaving (SI) scrambles the plurality of OFDM symbols across transmit antennas at the transmitter, using the secret key.

4. The method of claim 1, wherein the transmitted signal is changed such that the receiver is unable to recover correct data from the received signal unless the receiver re-scrambles the received signal using the secret key used at the transmitter.

5. The method of claim 1, wherein the PLS system is used for encryption in multiple-input multiple-output orthogonal frequency-division multiplexing (MIMO-OFDM) applications.

6. The method of claim 1, wherein for an OFDM system with N=128 and M=2, number of trials required to break the system for L=1 is $256! > 2^{1683}$.

7. The method of claim 1, wherein minimum mean-squared error (MMSE) equalization technique is used at the receiver for minimizing error signals.

8. A physical layer security (PLS) system for enhanced cryptographic security and diversity of transmitted data, the system comprising:
    a transmitter for first, converting the data into a plurality of OFDM symbols;
    second, multiplexing the plurality of OFDM symbols into parallel M OFDM streams; and
    third, performing spatial interleaving (SI) on the parallel M OFDM streams using a secret key, wherein PLS system security is proportional to $(N \times M \times L)!$, wherein N refers to data or number of OFDM symbols, M is number of transmit antennas and L is interleaver depth which refers to system delay or latency and $M \geq 2$.

9. The system of claim 8, further comprising a receiver for receiving and de-scrambling the transmitted data, wherein both the transmitter and receiver are software-defined radio (SDR) units.

10. The system of claim 9, wherein the SDR units are National Instruments Universal Software Radio Peripheral Reconfigurable input/output (NI USRP RIO) devices.

11. The system of claim 9, wherein the transmitted signal is changed such that the receiver is unable to recover correct data from a received signal unless the receiver re-scrambles the received signal using the secret key used at the transmitter.

12. The system of claim 9, wherein minimum mean-squared error (MMSE) equalization is used at the receiver for minimizing error signals.

13. The system of claim 8, wherein spatial interleaving (SI) scrambles the plurality of OFDM symbols across a plurality of transmit antennas at the transmitter, using the secret key.

14. The system of claim 8, wherein the plurality of transmit antennas are multiple-input and multiple-output (MIMO) antennas.

15. The system of claim 8, wherein the system provides more than 20 dB signal-to-noise ratio (SNR) improvement.

16. The system of claim 8, wherein the interleaver depth (L) used is 1, which reduces overall system latency in comparison with traditional Time Interleaving (TI) systems.

17. The system of claim 8, wherein the PLS system is used for encryption in multiple-input multiple-output orthogonal frequency-division multiplexing (MIMO-OFDM) applications.

18. The system of claim 8, wherein the PLS system is immune to narrowband jamming, and eliminates extra overhead introduced by conventional cryptosystems.

* * * * *